United States Patent
Latulipe

[11] Patent Number: 6,059,486
[45] Date of Patent: May 9, 2000

[54] FLAT KEY WASHER

[75] Inventor: Eric Latulipe, Longueuil, Canada

[73] Assignee: Pratt & Whitney Canada Inc., Longueuil, Canada

[21] Appl. No.: 09/089,453

[22] Filed: Jun. 3, 1998

[51] Int. Cl.$^7$ ............................................. F16D 1/06
[52] U.S. Cl. ..................... 403/383; 403/355; 403/365; 416/244 R
[58] Field of Search ................................. 403/383, 365, 403/355, 356, 359.1, 359.6, 375; 411/119, 120, 108, 109; 416/244 R, 246

[56] References Cited

U.S. PATENT DOCUMENTS

| | | |
|---|---|---|
| 1,145,256 | 7/1915 | Mochow et al. ............... 411/119 X |
| 2,508,832 | 5/1950 | McAninch ..................... 403/359.6 |
| 2,548,874 | 4/1951 | Darwin . |
| 2,675,844 | 4/1954 | Knohl . |
| 2,798,748 | 7/1957 | Maurer . |
| 2,919,940 | 1/1960 | Anderson ........................ 403/365 |
| 3,032,089 | 5/1962 | Gutshall . |
| 3,038,456 | 6/1962 | Dreisin . |
| 3,875,985 | 4/1975 | Okuda ............................ 411/120 |
| 4,477,228 | 10/1984 | Duffy et al. ................ 416/244 R X |
| 4,572,718 | 2/1986 | Stevens et al. ................ 411/119 X |
| 4,911,726 | 3/1990 | Warkentin . |
| 5,002,422 | 3/1991 | Schremmer et al. ............ 403/365 X |
| 5,152,631 | 10/1992 | Bauer ............................. 403/383 X |
| 5,395,194 | 3/1995 | Johnson et al. . |
| 5,507,586 | 4/1996 | Myszka .......................... 403/365 |

FOREIGN PATENT DOCUMENTS

| | | |
|---|---|---|
| 0321316 | 6/1989 | European Pat. Off. . |
| 1073115 | 9/1954 | France . |
| 2746836 | 4/1978 | Germany . |
| 3900797 | 11/1989 | Germany ......................... 403/383 |
| 2277570 | 11/1994 | United Kingdom . |

Primary Examiner—Harry C. Kim
Attorney, Agent, or Firm—Jeffrey W. Astle

[57] ABSTRACT

A key washer for interlocking a pair of concentric parts is described. The key washer is comprised of a flat, metal ring having an outer circumferential edge and an inner circumferential edge. Two or more formations are formed in the inner circumferential edge and adapted to be received on a mating formation of an inner one of the concentric parts. The outer circumferential edge has a plurality of straight flat sections for mating engagement with a corresponding configured surface of an outer one of the concentric parts. The metal ring prevents rotation between the concentric parts. The washer is utilized in a preferred application for interlocking an aircraft turbine engine high pressure rotor assembly and a tie shaft nut.

7 Claims, 4 Drawing Sheets

FLAT KEY WASHER

BACKGROUND OF THE INVENTION

1. Technical Field

The present invention relates to a key washer for interlocking a pair of concentric parts and particularly, but not exclusively, for interlocking a coupling disk of an aircraft turbine engine high pressure rotor assembly and a tie shaft nut.

2. Background Art

Key washers are known for interlocking various types of concentric parts with a maximum of 3° adjustment between two mating parts. In particular, we are concerned with key washers for interlocking the high pressure disk assembly to a nut maintaining axial load with impeller through a tie shaft. In the prior art the standard key washer is provided with extension legs projecting from the outer and inner edges thereof. The outer extension legs are located in channels or grooves formed in the rotating disk. Because of their configuration these grooves increase stress concentration factor subjecting mating part (disk) to fatigue failure. It can be appreciated that the high pressure rotor assembly and the tie shaft are rotating at very high speeds and interconnected together through this key washer.

SUMMARY OF THE INVENTION

It is a feature of the present invention to provide a key washer for interlocking a pair of concentric parts and wherein the external legs of the key washer are replaced by straight flat sections for mating engagement with corresponding configured flat surface sections of an outer one of the concentric parts.

Another feature of the present invention is to provide a key washer which substantially overcomes the above disadvantages of the prior art and which thereby reduces stress concentration on the rotor disk, particularly at high rotational speeds.

Another feature of the present invention is to reduce the machining cost of the outer mating part and reduce part deviation.

It is another feature of the present invention to provide a key washer having flat, straight formation means provided on both its outer and inner circumferential edge for mating engagement with like configured surface sections of an outer and inner concentric part to interlock the concentric parts together.

According to the above features, from a broad aspect, the present invention provides a key washer in combination with a pair of concentric parts for interconnecting the concentric parts. The key washer is formed by a metal ring having an outer circumferential edge and an inner circumferential edge. Two or more formation means are provided in the inner circumferential edge and adapted to mate with mating means of an inner one of the concentric parts. The outer circumferential edge has a plurality of straight flat sections for mating engagement with inner flat surface section of an outer one of the concentric parts. The flat sections are disposed in side-by-side relationship about the entire outer circumferential edge and there are more of the flat sections than inner flat surface sections of the outer one of the concentric parts. The metal ring prevents rotation between the concentric parts.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
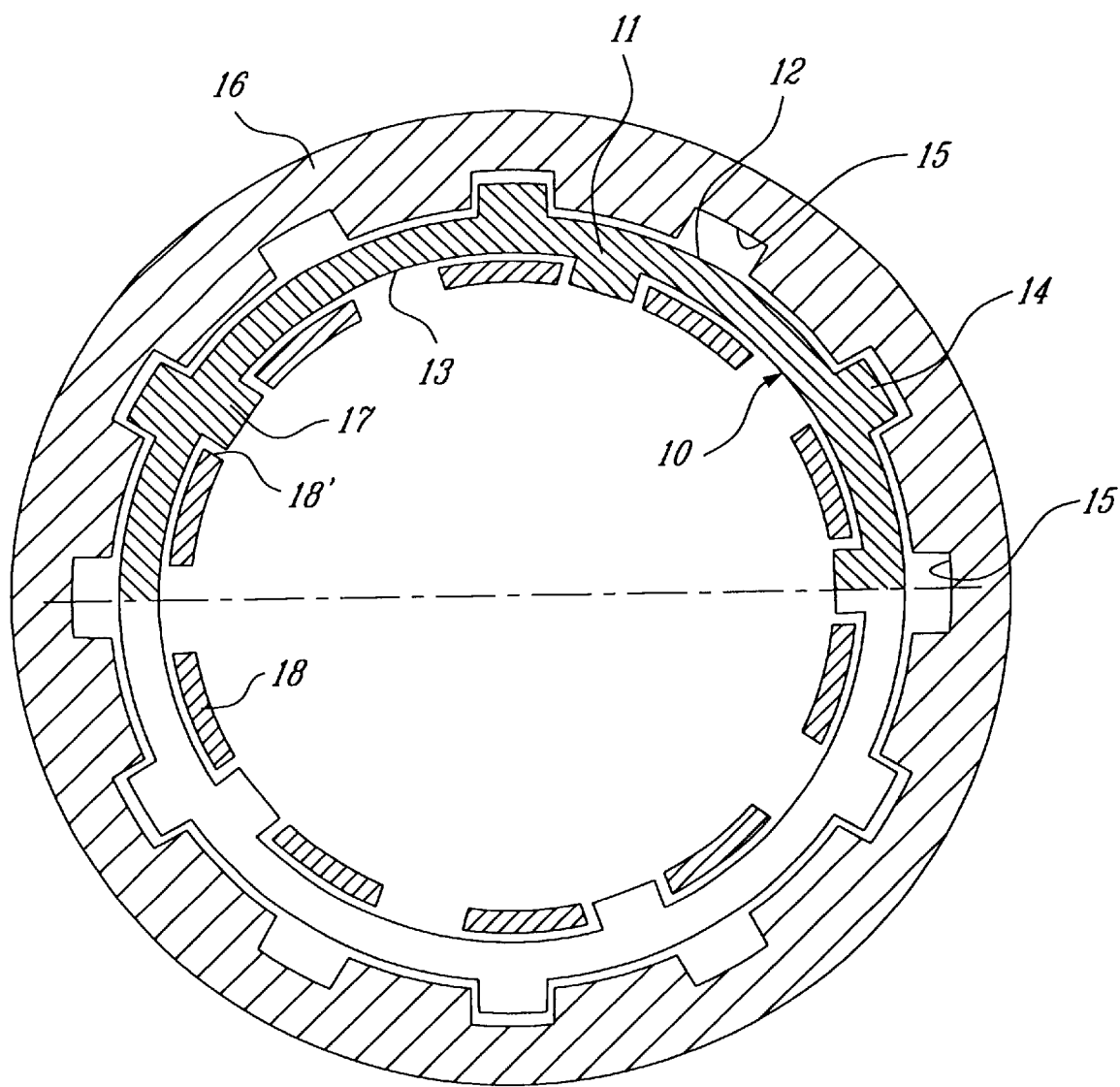
FIG. 1 is a simplified section view showing the construction of a standard key washer of the prior art for connecting an inner concentric part to an outer concentric part.

Referring now to the drawings, and more particularly to FIG. 1, there is shown at 10 a key washer constructed in accordance with the prior art. The key washer consists of a metal ring 11 having an outer circumferential edge 12 and an inner circumferential edge 13. Projecting legs, herein external projecting legs 14, are formed integral with the ring and extend from the outer circumferential edge 12. These legs are located in grooves or channels 15 formed in the coupling disk 16. The internal projecting legs 17 are disposed in slots 18' formed within the tie shaft nut 18.

The grooves 15 are of rectangular contour and it can be seen that when these concentric parts are rotating at very high speeds, the grooves, because of their size and configuration, will subject the disk to stress concentration and this could cause failure of the disk.

Figure 2A:
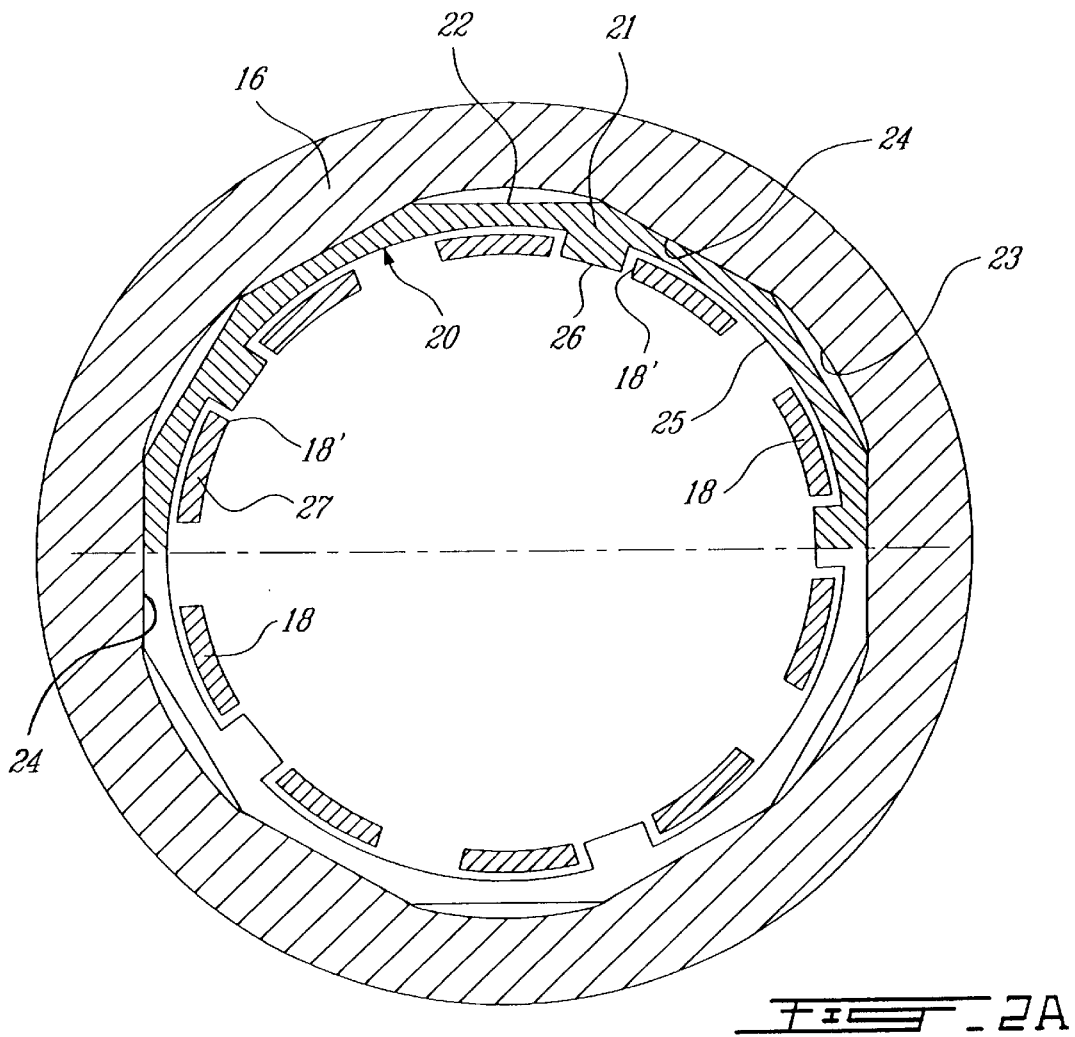
FIG. 2A is a section view similar to FIG. 1 but illustrating the improved key washer design of the present invention.

With reference now to FIG. 2, there is shown generally at 20 the improved key washer of the present invention. As hereinshown it is also constructed as a flat metal ring 21 but instead of external projecting legs formed on its outer circumferential edge, the edge is itself formed with a plurality of straight flat sections 22, herein twelve flat sections, disposed in a side-by-side relationship all around the key washer. The coupling disk 16 has an inner surface 23 which is provided with six mating flat surface sections 24 for receiving thereagainst six of the straight flat sections 22 of the key washer 20. Accordingly, the stress concentration factor is greatly reduced on the mating parts due to the smooth geometry. Another advantage of such improved key washer is that it results in a cost saving in the manufacture of the coupling disk.

Like the key washer of the prior art, the inner circumferential edge 25 is also provided with internal projecting legs 26 which locate within the slots 18 of the tie shaft nut 27.

Figure 2B:
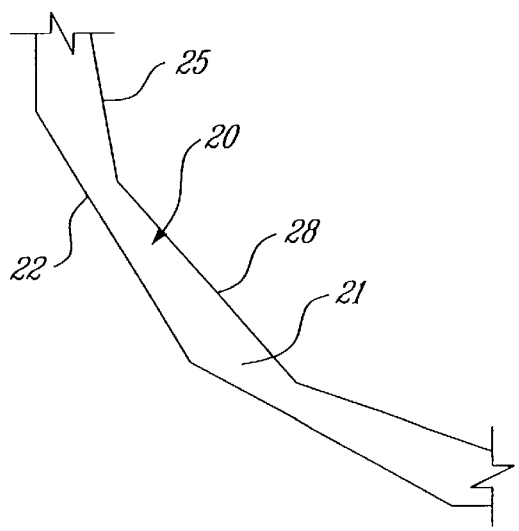
FIG. 2B is a fragmented plan view illustrating a further variant of the key washer of the present invention wherein the inner ring has six flat sections like the mating disk.

FIG. 2B shows a modification of the key washer 20 wherein the inner circumferential edge 25 may also be formed with straight flat sections 28 offset from the flat sections 22 formed on the outer peripheral edge of the ring. The tie shaft nut 27 would then have to be machined to provide flat mating surface sections to co-act therewith.

Figure 2C:
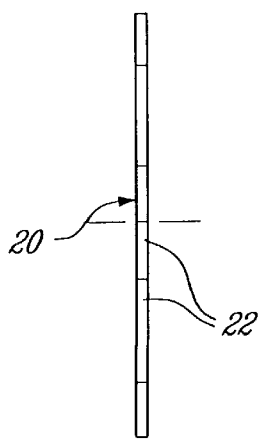
FIG. 2C is a side view of the key washer of FIG. 2A.

FIG. 2C is a side view of the ring to illustrate the flatness thereof as well as the disposition of the straight flat sections 22.

Figure 3:
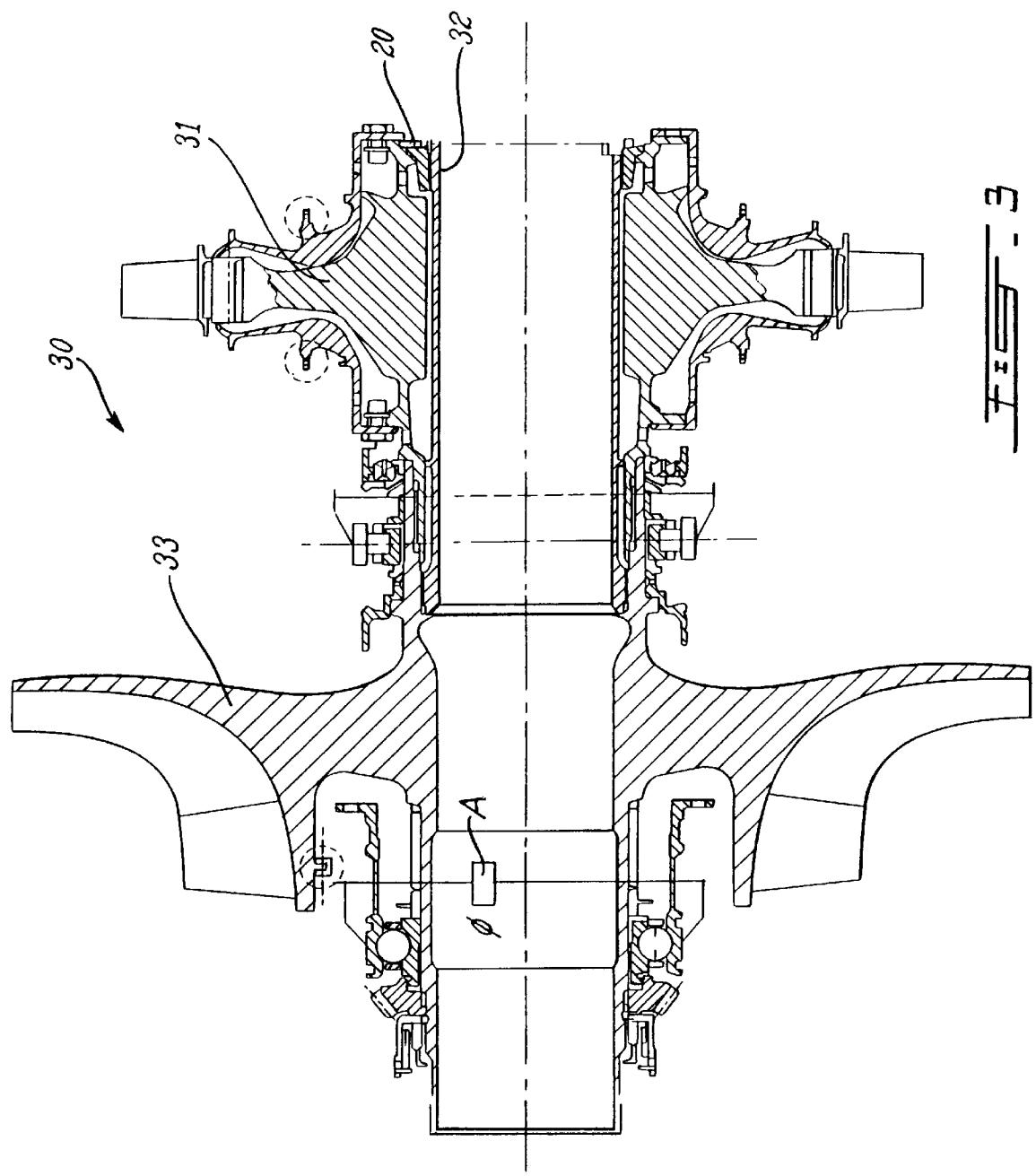
FIG. 3 is a schematic illustration of an aircraft turbine engine showing the connection of the high pressure compressor to the high pressure disk assembly through a tie shaft forming the high pressure rotor.
Figure 4:
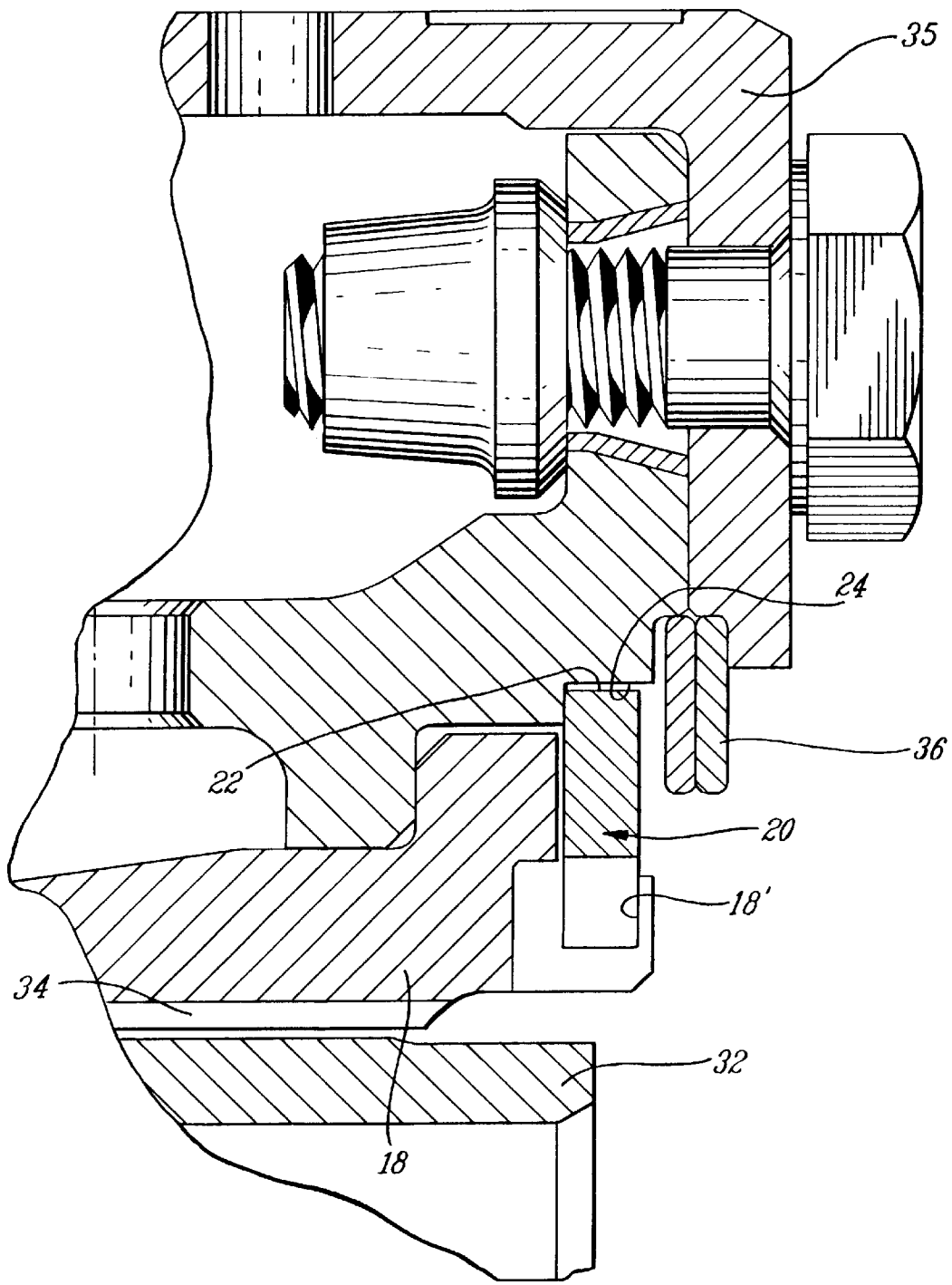
FIG. 4 is an enlarged view showing the interconnection of the tie shaft to the high pressure rotor through the flat key washer of the present invention which interconnects the coupling disk to the tie shaft nut.

FIG. 3 is a simplified section view showing a high pressure rotor assembly 30 of an aircraft turbine engine. The high pressure disk assembly 31 is connected to the tie shaft 32 through the nut 18, as better seen from FIG. 4, to couple the high pressure compressor assembly 33 to the disk assembly 31. As shown in FIG. 4, the key washer 20 is secured to the tie shaft nut 18 through its projecting legs 26 extending with the slots 18' of the nut 18. The nut 18 is coupled to the tie shaft 32 through a threaded connection 34. The flat sections 22 are in mating engagement with corresponding flat surface sections 24 formed in the disk. A retention clip 36 maintains the key washer captive.

Those skilled in the art will appreciate that the conception, upon which this disclosure is based, may readily be utilized as a basis for the designing of other structures, for carrying out the several purposes of the present invention. It is important, therefore that the claims be regarded as including such equivalent constructions insofar as they do not depart from the spirit and scope of the present invention.

I claim:

1. A key washer in combination with a pair of concentric parts for interconnecting said concentric parts, said key washer being formed by a metal ring having an outer circumferential edge and an inner circumferential edge, two or more formation means in said inner circumferential edge and adapted to mate with mating means of an inner one of said concentric parts, said outer circumferential edge having a plurality of straight flat sections for mating engagement with inner flat surface sections of an outer one of said concentric parts, said flat sections being disposed in side-by-side relationship about said entire outer circumferential edge, there being more of said flat sections than said inner flat surface sections of said outer one of said concentric parts, said metal ring preventing relative rotation between said concentric parts.

2. A key washer as claimed in claim 1 wherein said metal ring is a flat metal ring, said outer and inner circumferential edges being narrow edges.

3. A key washer as claimed in claim 1 wherein said formation means are spaced-apart tabs formed integral with said metal ring and projecting from said inner circumferential edge.

4. A key washer as claimed in claim 3 wherein said tabs are of rectangular configuration defining short end edges and a long straight outer end edge.

5. A key washer as claimed in claim 1 wherein said formation means are spaced straight flat sections disposed side-by-side along said inner circumferential edge.

6. A key washer as claimed in claim 1 wherein said outer concentric part is a coupling disk of an aircraft turbine engine high pressure rotor assembly and said inner concentric part is a tie shaft nut secured to a tie shaft connected to a high pressure compressor.

7. A key washer as claimed in claim 1 wherein there are twice as many said flat sections on said outer circumferential edge of said metal ring than said flat surface sections of said outer one of said concentric parts.

* * * * *